(12) United States Patent
Park

(10) Patent No.: US 6,212,847 B1
(45) Date of Patent: Apr. 10, 2001

(54) FRAME-CONNECTING MEMBERS AND MANUFACTURING METHOD THEREFOR

(76) Inventor: Sang Do Park, 105-1303, Samsung Apt, #817 Majang-dong, Sungdong-gu, Seoul (KR)

( * ) Notice: Subject to any disclaimer, the term of this patent is extended or adjusted under 35 U.S.C. 154(b) by 0 days.

(21) Appl. No.: 09/335,786

(22) Filed: Jun. 18, 1999

(30) Foreign Application Priority Data

Jun. 22, 1998 (KR) .................................................. 98-23301

(51) Int. Cl.$^7$ .................................. E04C 2/58; E04C 3/32
(52) U.S. Cl. .................... 52/655.1; 52/653.1; 52/745.19; 52/81.3; 29/897.312; 403/169; 403/180; 403/218
(58) Field of Search ................................. 52/81.3, 653.2, 52/655.1, 745.19; 29/897.312; 403/169, 180, 218

(56) References Cited

U.S. PATENT DOCUMENTS 5,518,333 * 5/1996 Cienkus, Jr. et al. ............... 403/169
5,944,441 * 8/1999 Schutze ........................... 52/653.2 X
6,000,175 * 12/1999 Gale et al. ....................... 52/653.2 X

* cited by examiner

Primary Examiner—Christopher T. Kent

(57) ABSTRACT

Disclosed are frame-connecting members such as straight, straight-curved, T-shaped and cross-shaped connecting members being used when assembling or fabricating vinyl houses, etc, and method for manufacturing the same. The frame-connecting member comprises a first connecting part, having a metal pipe shape, which connects a frame of a first direction, a second connecting part, having a metal pipe shape and corresponding to the first connecting part, which connects a frame of a second direction, and a fixed part, placed between the first connecting part and the second connecting part and molded with the molding material of a synthetic resin, which connects the connecting parts. A method for manufacturing a frame-connecting member comprises the steps of (a) forming a hole, (b) disposing an upper molding frame and a lower molding frame, (c) introducing a molding material into the fixed part, (d) releasing the upper and lower molding frames from the fixed part, (e) forming a connecting groove, and (f) inserting rods into the opposedly-placed first and second connecting parts. The frame-connecting member according to the present invention provides a straight connecting member having two-way connecting holes into which common pipe frames are inserted, a straight-curved connecting member for a curved two-way connected section, a three-way connecting member for a three-way connected section, and a four-way connecting member for a four-way connected section, respectively.

5 Claims, 4 Drawing Sheets

FRAME-CONNECTING MEMBERS AND MANUFACTURING METHOD THEREFOR

BACKGROUND OF THE INVENTION

1. Field of the Invention

The present invention relates to cross-shaped, T-shaped, straight and straight-curved connecting members being used when assembling or fabricating a swimming pool, parapets, vinyl houses, etc, and method for manufacturing the same.

2. Description of Related Art

When the swimming pool, parapets and vinyl houses are assembled or fabricated as simplified facilities, pipe frames are used as foundation means or support means of a tent. This support means connects a plurality of frames in various directions to form roofs and sides of a structure. At this time, a predetermined connecting means is required to connect the frames.

The connecting means forms a connecting opening into which the pipe frame is inserted. A straight connecting member is used for connecting two frames linearly. A straight-curved connecting member is used for treating curved portions such as a roof, and a T-shaped connecting member is adopted for connecting frames vertically and horizontally in three directions, and also a cross-shaped connecting member is necessary for forming a central support framework.

The connecting members should be made to fit into respective connecting sections prior to construction work. These connecting members are generally molded with a molding material such as synthetic resins. Such a connecting member made from the synthetic resins has a drawback that frame-connected sections are easily broken down due to heavy load of frames. To improve this drawback, the connecting member made from a metal material has been proposed, but also has defects including complicated producing method, considerable load and expensive producing cost.

Furthermore, there has been attempted a combined connecting member in which a connected section is only manufactured with a metal pipe and a connecting part is made from the synthetic resins. However, this combination also includes problems to cause complicated manufacturing facilities and process for combination with the metal material and the synthetic resins, to contain difficulty in installing the manufacturing facilities, and to incur expensive producing cost.

Accordingly, the connecting member is required to have a simplified structure that the connecting parts are made with the metal material and a fixed part disposed between the connecting parts is formed with the synthetic resins, and also it is needed that a manufacturing method therefor is simplified by molding.

SUMMARY OF THE INVENTION

Therefore, to solve the above problems, it is an object of the present invention to provide a connecting member which includes a fixed part made from a synthetic resin and connecting parts made from a metal material.

Another object of the present invention is to provide a method for manufacturing a frame-connecting member by combination between the molding of a synthetic resin and a frame support of a metal material.

To accomplish one object of the present invention, there is provided a frame-connecting member, comprising:

a first connecting part, having a metal pipe shape, for connecting a frame of a first direction; a second connecting part, having a metal pipe shape and corresponding to the first connecting part, for connecting a frame of a second direction; and a fixed part, placed between the first connecting part and the second connecting part and molded with the molding material of a synthetic resin, for connecting the connecting parts.

The present invention manufactures a T-shaped fixed part forming a third connecting part extending vertically to any one of upper and lower vertical directions, and a cross-shaped fixed part forming third and fourth connecting parts extending respectively to the upper and lower vertical directions.

To accomplish another object of the present invention, there is provided a method for manufacturing a frame-connecting member, the method comprising the steps of:

(a) forming a hole vertically passing at approximately the center of a linear pipe member;

(b) disposing an upper molding frame having an inlet above the hole and a lower molding frame corresponding to the upper molding frame below the hole, in order to form a fixed part at an outer circumference of the pipe member having the hole;

(c) introducing a molding material into the fixed part to form the first and second connecting parts from the pipe member; and (d) releasing the upper and lower molding frames from the fixed part to which the first and second connecting parts are associated after the introduced molding material is solidified;

(e) forming a connecting groove made along the hole in order to reinforce the fixed part, between the steps of (a) and (b); and (f) inserting rods into the oppositely-placed first and second connecting parts at a predetermined interval from inner circumferential surfaces thereof, between the steps of (b) and (c).

The frame-connecting member according to the present invention provides a straight connecting member having two-way connecting holes into which common pipe frames are inserted, a straight-curved connecting member for a curved two-way connected section, a three-way connecting member for a three-way connected section, and a four-way connecting member for a four-way connected section, respectively.

Accordingly, the present invention provides a simplified frame manufacturing method, overcoming a defect that the connecting member obtained by the molding of the synthetic resin is frequently broken down.

Also, the present invention is characterized by providing a frame-connecting member in which a fixed part made from the synthetic resin and connecting parts made from the metal material are incorporated, and providing a method for manufacturing the frame-connecting member by the molding of the synthetic resin and a frame support of the metal material.

BRIEF DESCRIPTION OF THE DRAWINGS

Preferred embodiments are described with reference to the drawings wherein.

DETAILED DESCRIPTION OF THE PREFERRED EMBODIMENTS

Preferred embodiments of the present invention will be described below in more detail with reference to the accompanying drawings.

Figure 5:
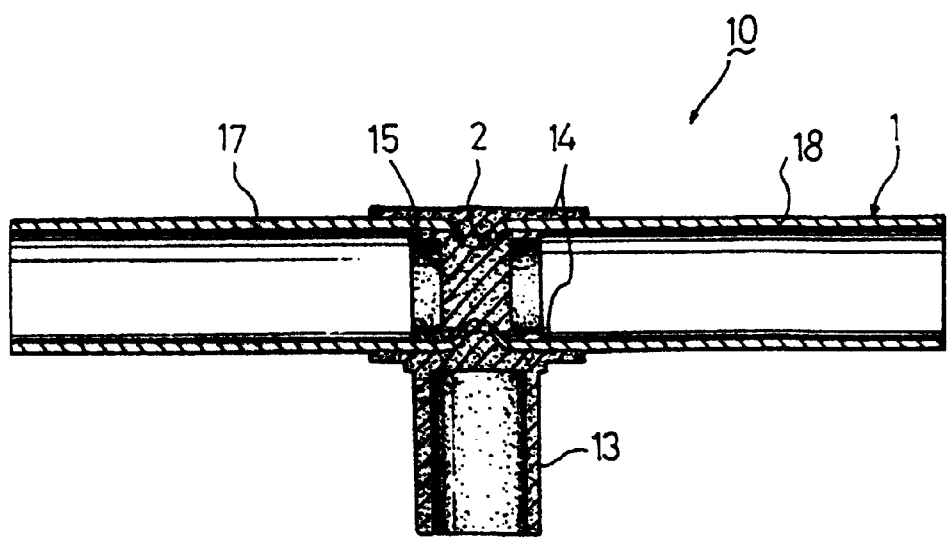
FIG. 5 is a view showing a state that a T-shaped frame-connecting member is finished according to the present invention.
Figure 6:
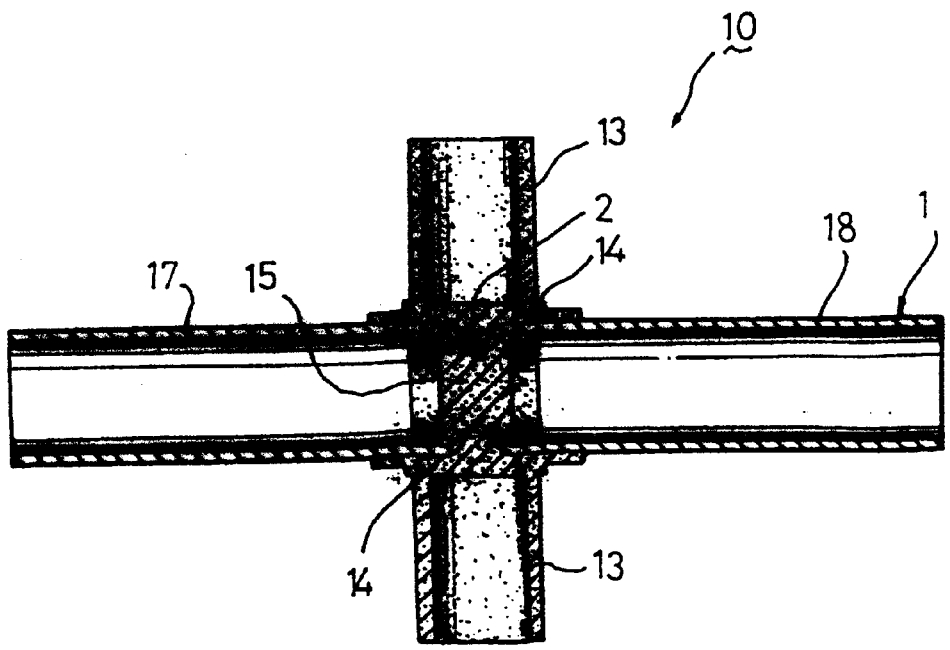
FIG. 6 is a view showing a state that a cross-shaped frame-connecting member is finished according to the present invention.
Figure 8:
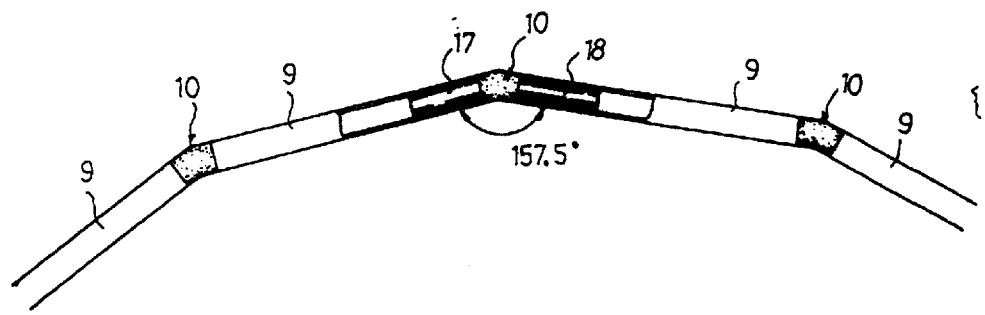
FIG. 8 is a view showing a state that curved connecting members are arranged.

FIG. 5 is a view showing a state that a T-shaped frame-connecting member is finished according to the present invention, FIG. 6 is a view showing a state that a cross-shaped frame-connecting member is finished according to the present invention, and FIG. 8 is a view showing a state that curved connecting members are arranged.

Referring to FIGS. 5, 6 and 8, a connecting member 10 comprises a first connecting part 17 for connecting a frame of a first direction, a second connecting part 18 for connecting a frame of a second direction which corresponds to the first connecting part 17, and a fixed part for connecting the first connecting part 17 and the second connecting part 18.

The connecting member 10 of the present invention has a straight fixed part (not shown). The connecting member 10 having the straight fixed part can be also implemented as schematically shown in FIG. 8. The curved connecting member has an angle of 157.5 degrees, of which the angle can be adjusted according to necessity.

FIG. 5 shows that the frame-connecting member 10 according to the present invention has a three-way fixed part. That is, the connecting member 10 is a T-shaped connecting member forming a third connecting part 13 vertically extending the fixed part 14 downward.

FIG. 6 shows a cross-shaped connecting member that the fixed part 14 vertically extends upward and downward to form third and fourth connecting parts 13.

The connecting member 10 will be described according to respective processes with reference to the drawings.

Figure 1A:
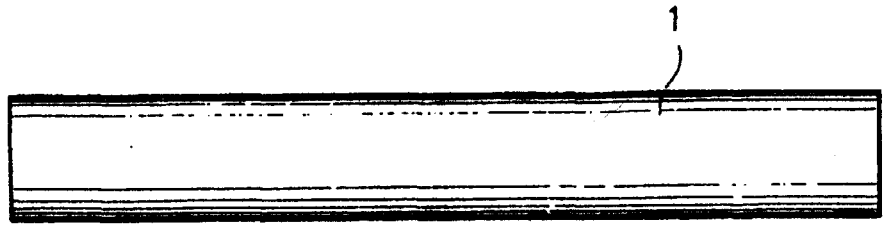
FIGS. 1A and 1B are views showing a process of manufacturing a frame-connecting member according to the present invention.
Figure 1B:
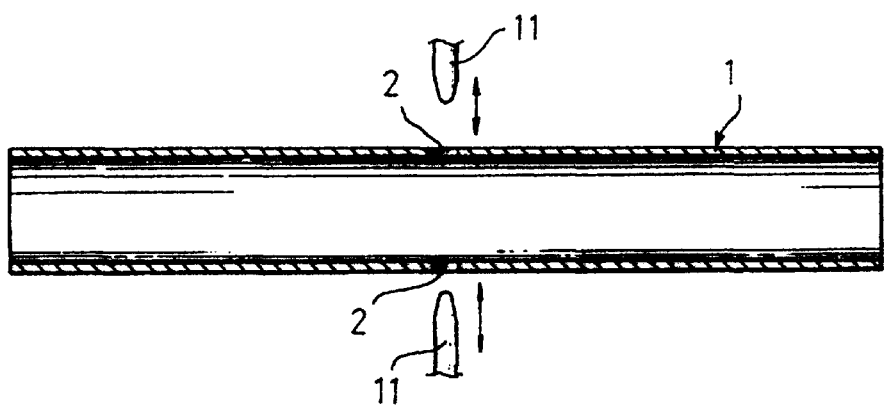

FIGS. 1A and 1B are views showing a process of manufacturing a frame-connecting member according to the present invention.

Referring to FIGS. 1A and 1B, in order to manufacture a pipe member 1 to the connecting member having a two-way fixed part, about the center of which a hole 2 is formed by being vertically perforated with a punch 11.

Figure 2A:
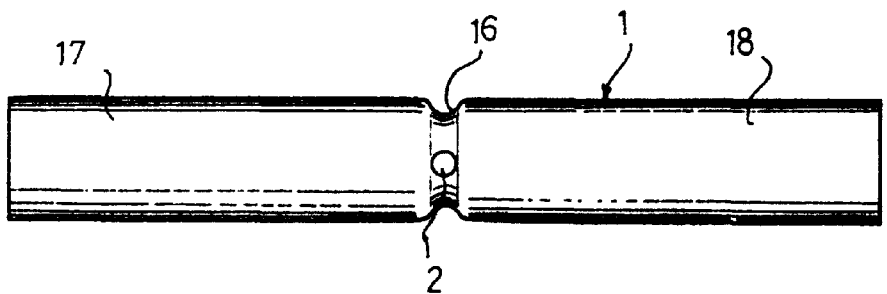
FIGS. 2A and 2B are views showing a process of forming a connecting groove to manufacture a frame-connecting member according to the present invention.
Figure 2B:
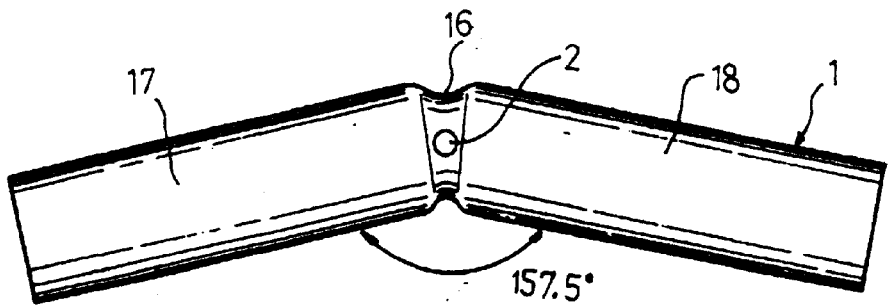

FIGS. 2A and 2B show a process of forming a connecting groove to manufacture a frame-connecting member according to the present invention. This process is to form a connecting groove 16 concaved toward the inside from the outside of the pipe member 1 along the hole 2. Accordingly, an external area of the fixed part 14 made from the molding material is reinforced, but such reinforcing process can be omitted according to necessity.

Figure 3A:
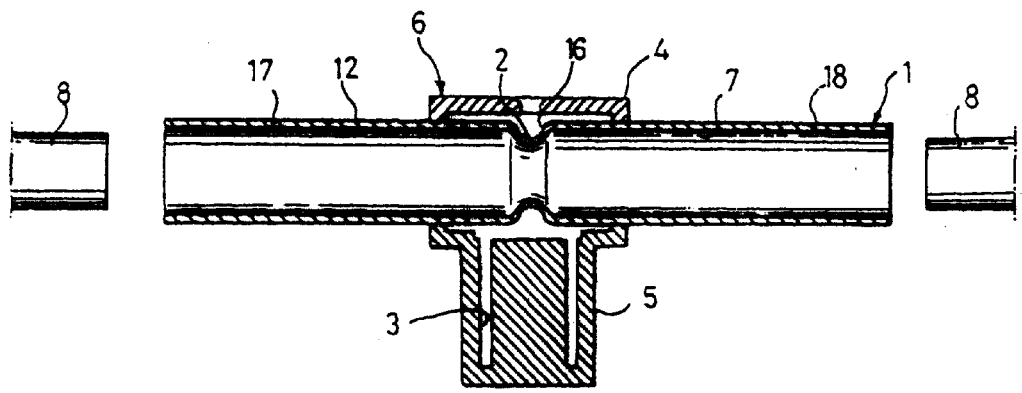
FIGS. 3A and 3B are views showing a process of manufacturing a T-shaped frame-connecting member according to the present invention.
Figure 3B:
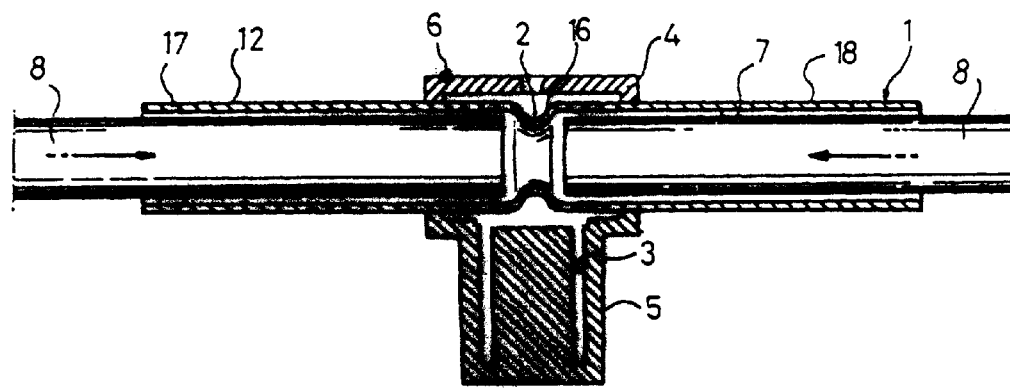

FIGS. 3A and 3B are views showing a process of manufacturing a T-shaped frame-connecting member according to the present invention. FIG. 3A shows a process of combining a molding frame 6 in which upper and lower molding frames 4 and 5 are incorporated to the fixed part, and a state before rods 8 are inserted into the connecting parts 17 and 18.

In order to form a predetermined fixed part 14 covering an outer circumference of the pipe member 1 having the hole 2 with the molding material, the upper molding frame 4 having an inlet above the hole 2 is dispositioned, and the lower molding frame 5 corresponding to the upper molding frame 4 is placed below the hole 2.

The molding frame 6 has a diameter larger than an outer diameter of each pipe member 1, inside which a filling space to be filled with the molding material is formed. Especially, the lower molding frame 5 of the molding frame 6 includes a predetermined cylindrical space 3 dispositioned downward therefrom, to form the lower connecting part 13.

The lower molding frame 5 omits the lower fixed part to form the cylindrical space 3 when manufacturing a straight connecting member. That is, the lower molding frame 5 is arranged to correspond to the upper molding frame 4.

To manufacture the curved fixed part for two-way connection of a curved section, it is necessary for the molding frame 6 to be bent at a predetermined angle.

As shown in FIG. 3B, after the molding frame 6 is installed, the rods 8 having a diameter smaller than an inner diameter of the pipe member 1 are inserted into the first and second connecting parts 17 and 18 oppositely disposed to each other. At this time, the molding rods 8 are inserted slightly apart from an inner circumferential surface 7 of the pipe member 1. Such a structure is to prevent the molding material from flowing into the inside of the pipe member in a process of introducing the molding material to be described hereinafter.

Figure 4:
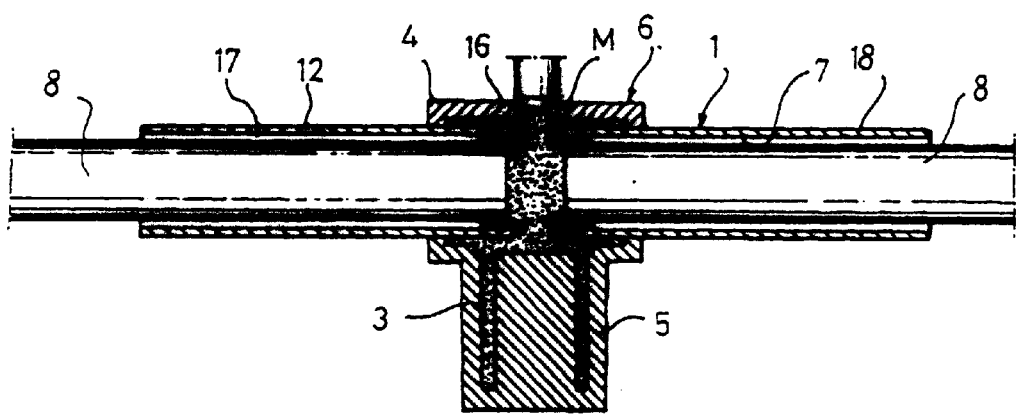
FIG. 4 is a view showing a process of introducing a molding material into a T-shaped fixed part for manufacturing a frame-connecting member according to the present invention.

FIG. 4 is a view showing a process of introducing the molding material into a T-shaped fixed part for manufacturing a frame-connecting member according to the present invention.

That is, a molding material M is introduced to the upper and lower molding frames 4 and 5 so that both sides of the pipe member 1 are separated to the first connecting part 17 and the second connecting part 18 centering the fixed part 14, and are cooled for a predetermined time.

After cooling, the upper and lower molding frames 4 and 5 are released and the molding rods 8 are separated, thereby the three-way T-shaped connecting member 10 composed of the first and second connecting parts 17 and 18 and the third connecting part 13 is finished. FIG. 5 shows an example that the T-shaped frame-connecting member is finished according to the present invention.

Figure 7:
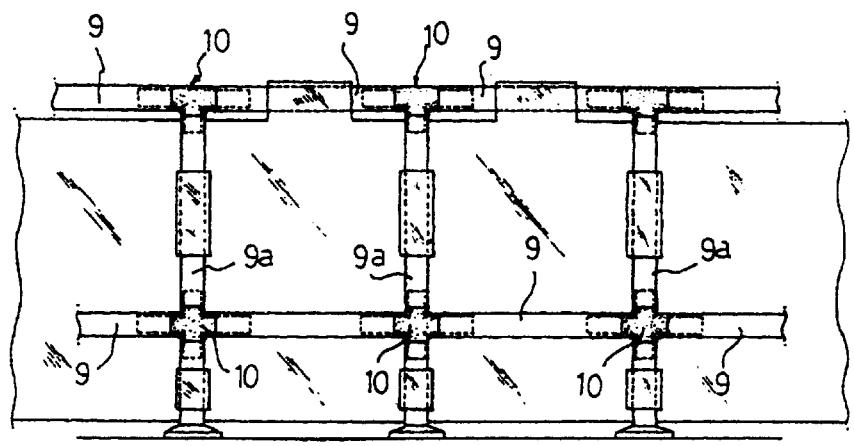
FIG. 7 is a view showing a state that frame-connecting members are fabricated.

FIG. 7 is a view showing a state that frame-connecting members are fabricated. Referring to FIG. 7, longitudinal frames 9 and lateral frames 9a are connected with straight, T-shaped and cross-shaped connecting members.

Especially, as shown in FIG. 8, the straight-curved connecting member is used for a curved section of the straight portion.

Accordingly, the connecting member of the present invention has both fixed parts into which pipe frames are inserted, When connecting a plurality of frames, the straight connecting member is used for straight connection, the straight-curved connecting member for the curved section, the T-shaped connecting member for three-way connection, and the cross-shaped connecting member for four-way connection, respectively.

Accordingly, the connecting member according to the present invention can be easily obtained by the fixed part molded with the synthetic resin and the connecting part of the metal material.

The present invention provides the connecting member in which the fixed part of the synthetic resin and the frame-connecting parts of the metal material are incorporated, and particularly provides the connecting members of straight-curved, three-way and four-way shapes.

Also, the present invention provides a simplified method for manufacturing the frame support of the metal material as well as a molding method with the synthetic resin, thereby solving the defect in the conventional method disclosing combination between the metal pipe and molding of the synthetic resin.

Furthermore, the present invention improves a drawback that the fixed part of the conventional connecting member made from the synthetic resin has been easily broken out, and also provides simplified and short manufacturing process, compared with the conventional method of manufacturing only the fixed part with the metal material.

While only certain embodiments of the invention have been specifically described herein, it will be apparent that numerous modifications may be made thereto without departing from the spirit and scope of the invention.

What is claimed is:

1. A frame-connecting member, comprising:
    a first connecting part, having a pipe shape, for connecting a frame of a first direction;
    a second connecting part, having a pipe shape and corresponding to said first connecting part, for connecting a frame of a second direction; and
    a fixed part, placed between said first connecting part and said second connecting part and molded with a molding material of a synthetic resin, for connecting said connecting parts.

2. The frame-connecting member according to claim 1, wherein said fixed part extends perpendicularly to any one of upper and lower vertical directions to form a three-way connecting part.

3. A method for manufacturing a frame-connecting member, comprising:
    (a) forming a hole vertically passing at approximately the center of a linear pipe member;
    (b) disposing an upper molding frame having an inlet above the hole and a lower molding frame corresponding to the upper molding frame below the hole, in order to form a fixed part at an outer circumference of the pipe member having the hole;
    (c) introducing a molding material into said fixed part to form first and second connecting parts from the pipe member; and
    (d) releasing the upper and lower molding frames from said fixed part to which said first and second connecting parts are associated after the introduced molding material is solidified.

4. The method according to claim 3, further comprising forming a connecting groove made along the hole in order to reinforce said fixed part, after forming the hole vertically and before disposing the upper and lower molding frames.

5. The method according to claim 3, further comprising inserting molding rods into the opposedly-placed first and second connecting parts at a predetermined interval from inner circumferential surfaces thereof, between disposing the upper and lower molding frames and introducing the molding material.

* * * * *